US010949056B2

(12) United States Patent
Kodali et al.

(10) Patent No.: US 10,949,056 B2
(45) Date of Patent: Mar. 16, 2021

(54) SYSTEM AND METHOD TO NAVIGATE 3D DATA ON MOBILE AND DESKTOP

(71) Applicant: salesforce.com, inc., San Francisco, CA (US)

(72) Inventors: Mrudula Kodali, San Francisco, CA (US); Sachin Desai, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/579,695

(22) Filed: Sep. 23, 2019

(65) Prior Publication Data

US 2020/0019296 A1   Jan. 16, 2020

Related U.S. Application Data

(63) Continuation of application No. 15/015,010, filed on Feb. 3, 2016, now Pat. No. 10,459,597.

(51) Int. Cl.
| | | |
|---|---|---|
| *G06F 3/048* | (2013.01) |
| *G06F 3/01* | (2006.01) |
| *G06F 3/0481* | (2013.01) |
| *G06F 3/0482* | (2013.01) |
| *G06F 3/03* | (2006.01) |
| *G06F 3/0484* | (2013.01) |

(52) U.S. Cl.
CPC .......... *G06F 3/04815* (2013.01); *G06F 3/011* (2013.01); *G06F 3/017* (2013.01); *G06F 3/0304* (2013.01); *G06F 3/0482* (2013.01); *G06F 3/04845* (2013.01)

(58) Field of Classification Search
CPC .......................... G06F 3/04815; G06F 3/0482
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

MaxKortlander, "Data Visualisation", Masters of Media, retrieved Jan. 15, 2016 <https://digialmethods,net/MoM/DataVisualisation> Sep. 22, 2014, 12 pages.

*Primary Examiner* — Nicholas Augustine
(74) *Attorney, Agent, or Firm* — Holland & Hart LLP

(57) ABSTRACT

Disclosed is a system and method to navigate high-dimensional data in order to enhance the analytical capabilities of a data consumer. The technology disclosed can use a stereoscopic 3D viewer with a smartphone, a pair of 3D glasses with desktop, or a projected 3D image on a table. The solution provides a novel and accessible way of navigating high-dimensional data that has been organized into groups of two or three dimensions. Navigation is possible in all 3 dimensions (x, y, z) to explore the full potential of underlying data and elicit powerful insights to be acted on through informed decisions.

20 Claims, 10 Drawing Sheets

Menu
Illustration for Point and
Dive

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,323,859 B1 * | 11/2001 | Gantt ................. G06T 19/20 345/419 |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,462,733 B1 * | 10/2002 | Murakami ............. G06F 3/033 345/156 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,377 B2 * | 3/2009 | Pihlaja ................. G06F 3/0338 345/156 |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,405,604 B2 * | 3/2013 | Pryor .................... G16H 40/63 345/156 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,514,221 B2 * | 8/2013 | King ..................... G06T 19/00 345/419 |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 9,104,271 B1 * | 8/2015 | Adams .................. G06F 3/014 |
| 9,996,797 B1 * | 6/2018 | Holz ................... G06F 3/04842 |
| 10,168,873 B1 * | 1/2019 | Holz ................... G06F 3/0304 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0195156 A1 * | 9/2005 | Pihlaja ................. G06F 3/03547 345/156 |
| 2006/0021019 A1 | 1/2006 | Hinton et al. |
| 2006/0187196 A1 * | 8/2006 | Underkoffler ...... G06K 9/00375 345/156 |
| 2008/0122786 A1 * | 5/2008 | Pryor .................... G06F 3/038 345/156 |
| 2008/0249972 A1 | 10/2008 | Dillon |

(56) References Cited

U.S. PATENT DOCUMENTS

| | | | |
|---|---|---|---|
| 2009/0031240 A1* | 1/2009 | Hildreth | G06F 3/017 715/772 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2010/0053151 A1* | 3/2010 | Marti | G06F 3/017 345/419 |
| 2010/0149096 A1* | 6/2010 | Migos | G06F 3/04883 345/158 |
| 2010/0234094 A1* | 9/2010 | Gagner | G07F 17/32 463/20 |
| 2011/0218958 A1 | 9/2011 | Warshavksy et al. | |
| 2011/0247051 A1 | 10/2011 | Bulumulla et al. | |
| 2012/0042218 A1 | 2/2012 | Cinarkaya et al. | |
| 2012/0233137 A1 | 9/2012 | Jakobson et al. | |
| 2012/0249429 A1* | 10/2012 | Anderson | G06F 3/017 345/173 |
| 2012/0268364 A1* | 10/2012 | Minnen | G06F 3/0304 345/156 |
| 2012/0275686 A1* | 11/2012 | Wilson | G06K 9/00355 382/154 |
| 2012/0290407 A1 | 11/2012 | Hubbard et al. | |
| 2012/0290950 A1* | 11/2012 | Rapaport | H04N 21/8358 715/753 |
| 2013/0212497 A1 | 8/2013 | Zelenko et al. | |
| 2013/0247216 A1 | 9/2013 | Cinarkaya et al. | |
| 2015/0054729 A1* | 2/2015 | Minnen | G06K 9/00375 345/156 |
| 2015/0199022 A1* | 7/2015 | Gottesman | G06F 3/017 382/103 |
| 2015/0355805 A1* | 12/2015 | Chandler | G06F 3/04842 715/784 |
| 2017/0177087 A1* | 6/2017 | Lerner | G06F 3/0304 |
| 2017/0235377 A1* | 8/2017 | Marcolina | G06F 3/017 715/849 |

* cited by examiner

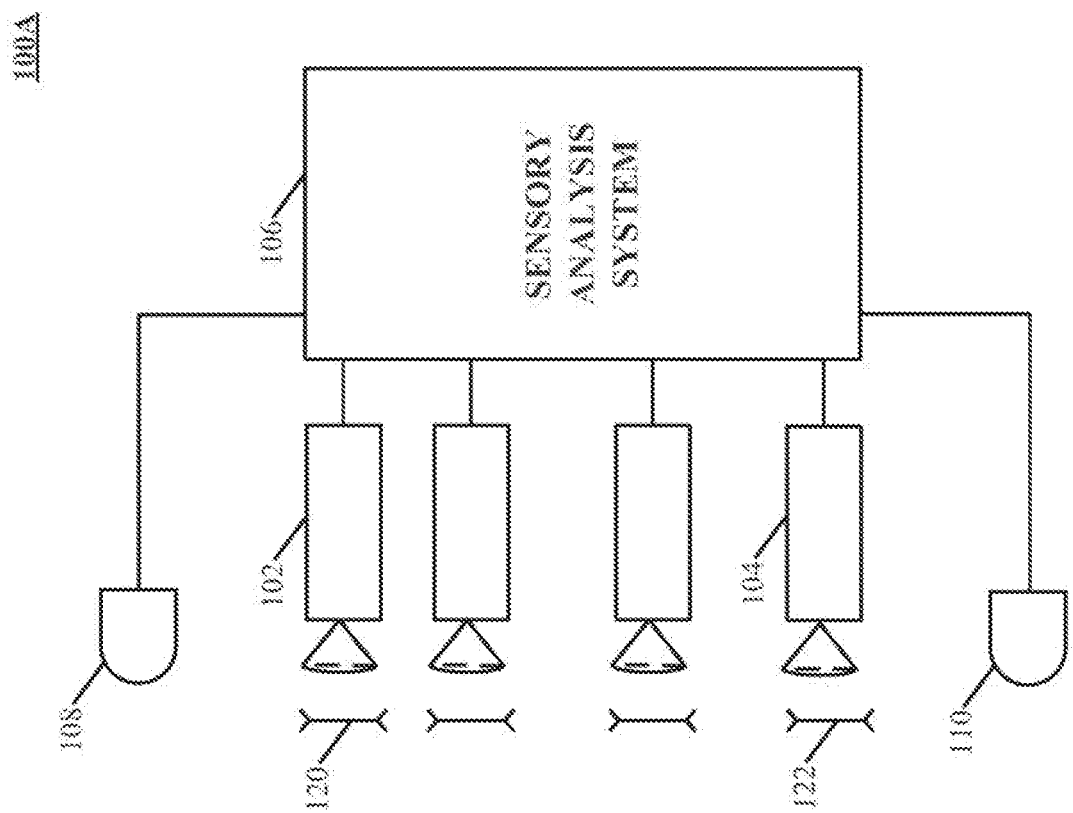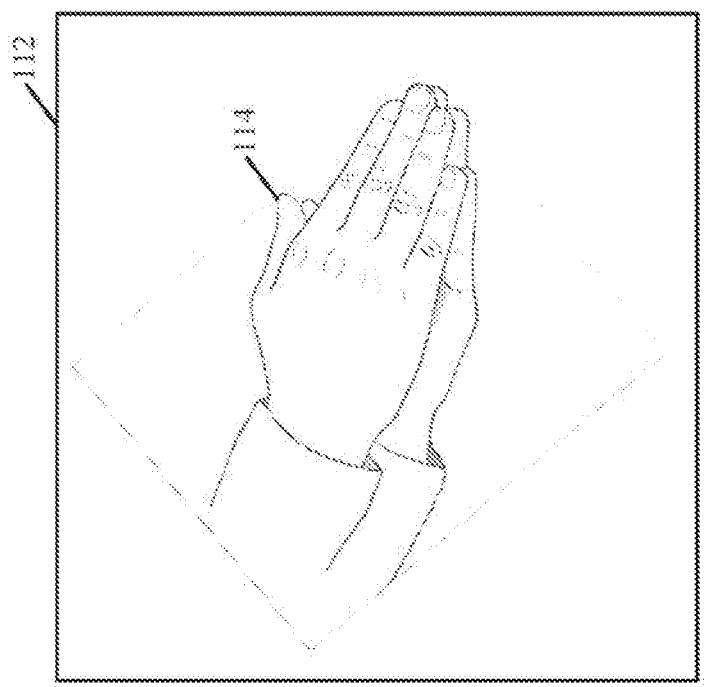
FIG. 1A

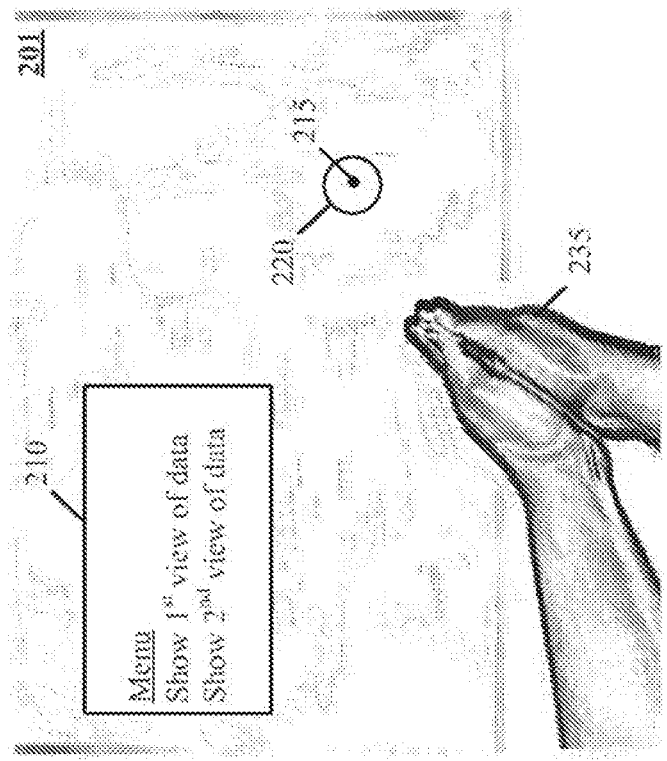
FIG. 2B – Dive
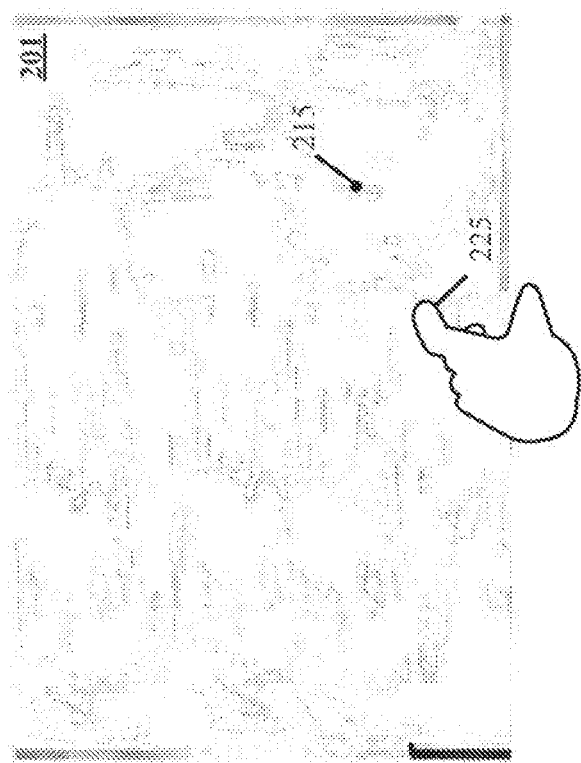
FIG. 2A – Point

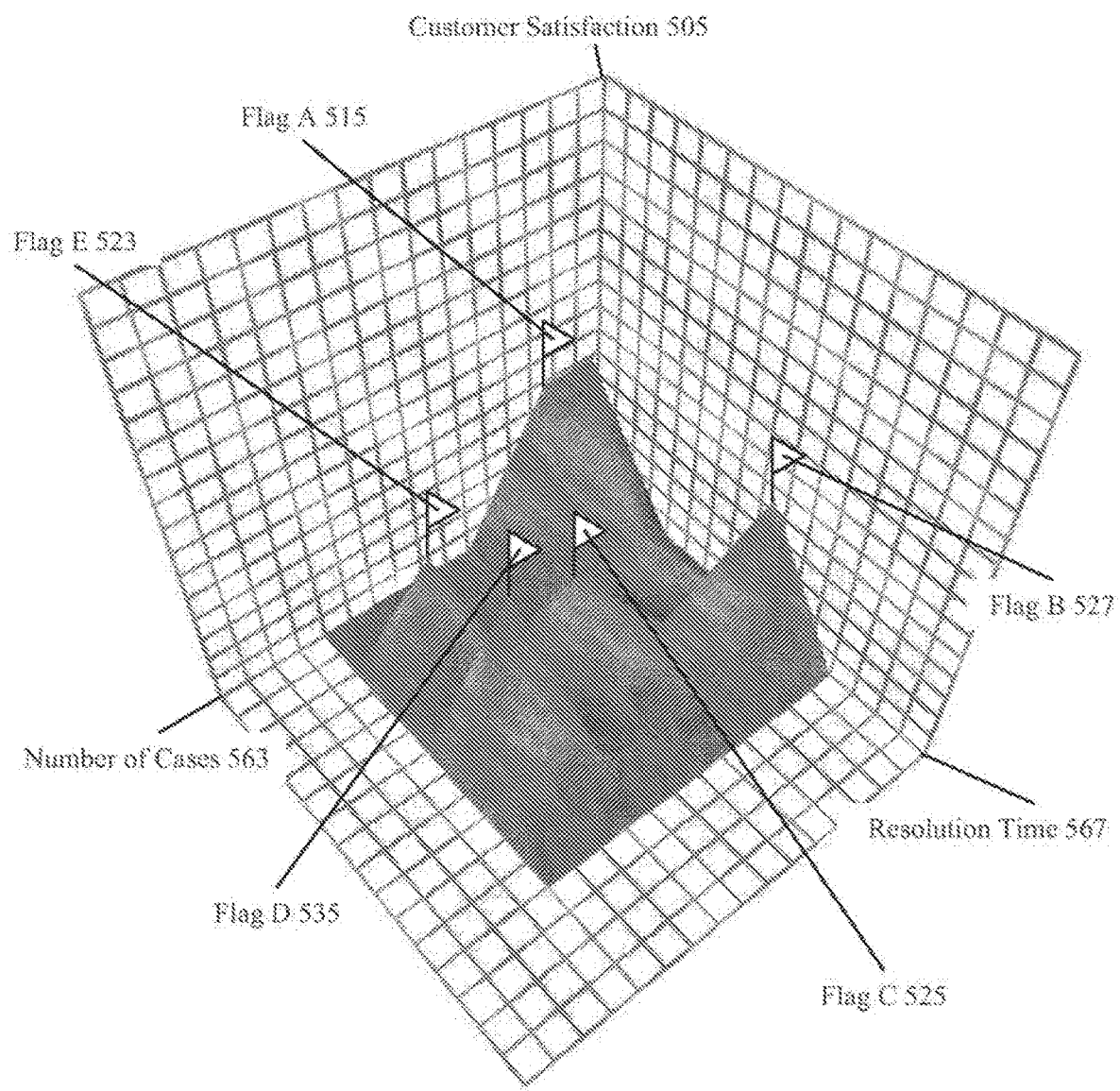
FIG. 5 – Illustration of Flags on a 3D Representation

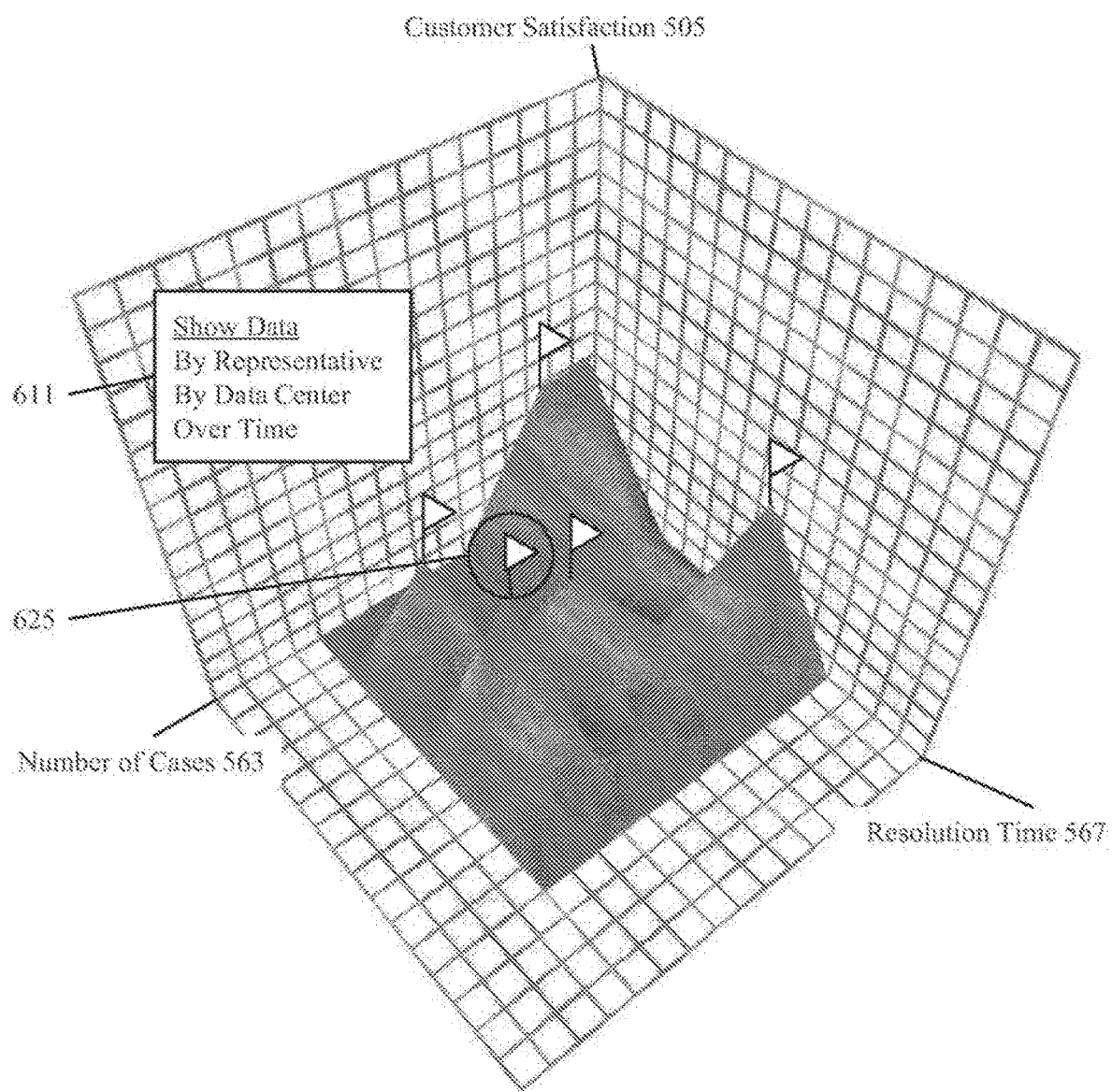
FIG. 6A – Menu Illustration for Point and Dive

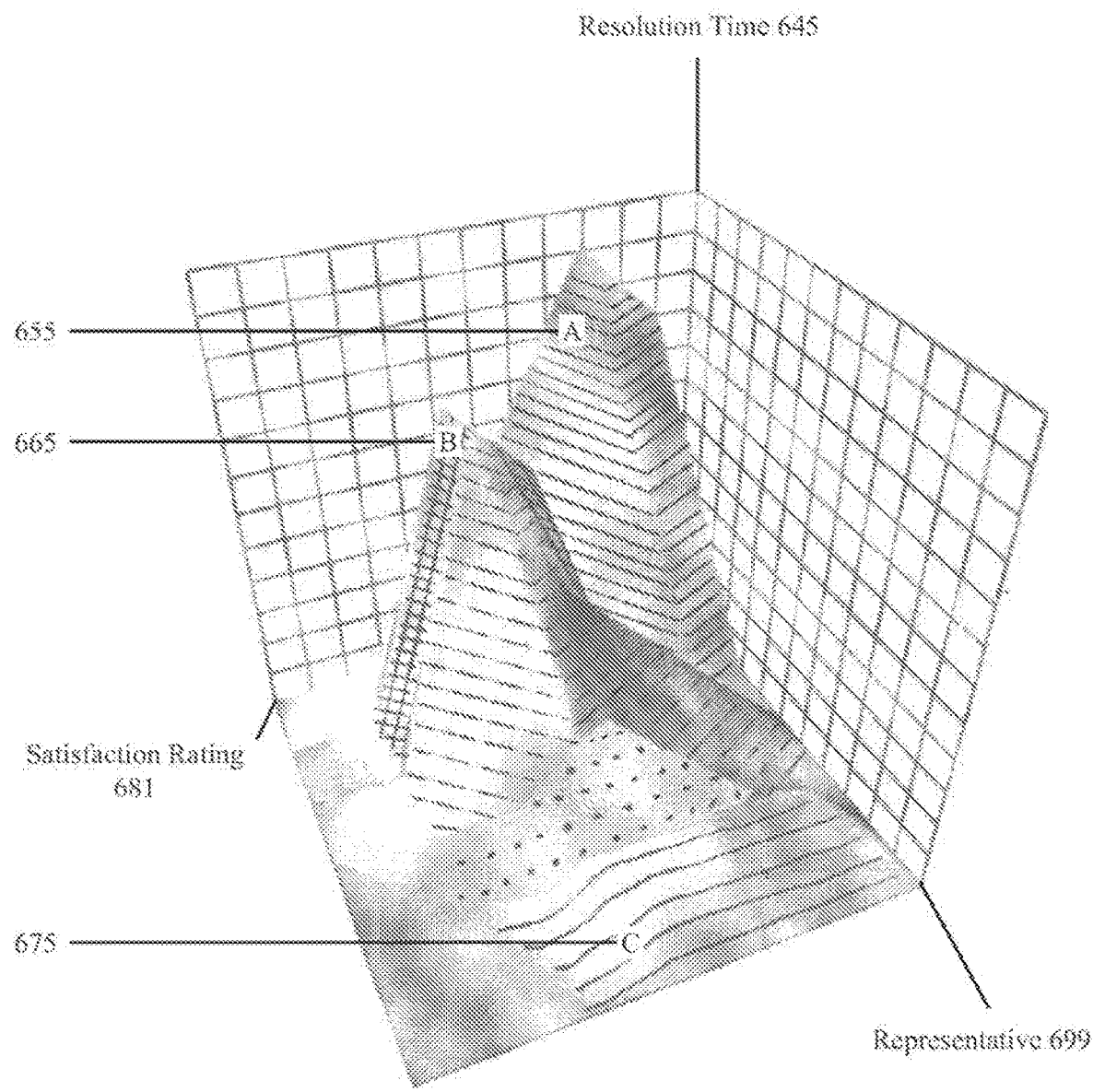
FIG. 6B – Outcome of a
Point and Dive Gesture –
By Representative

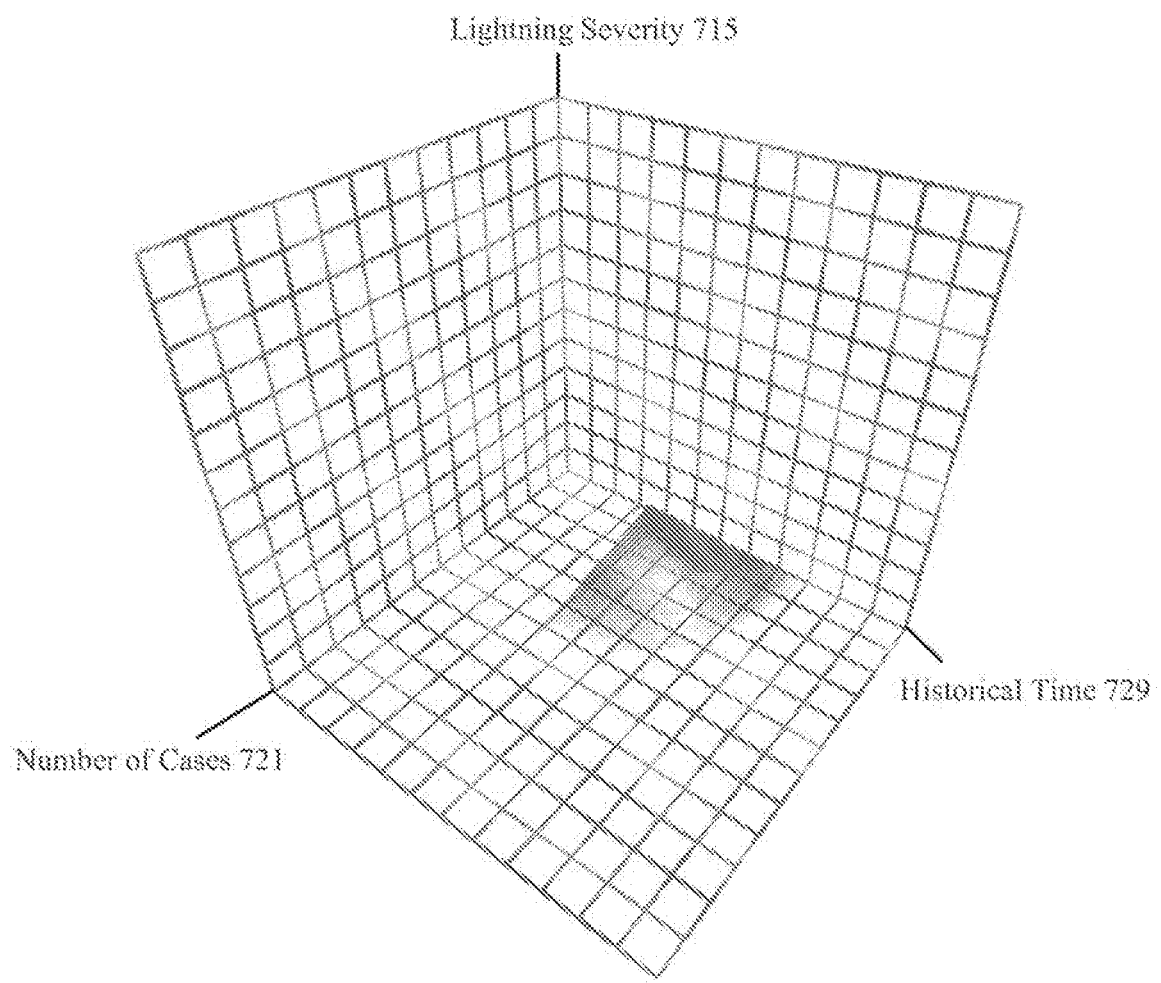
FIG. 7 – Outcome of a
Grab and Pluck Gesture

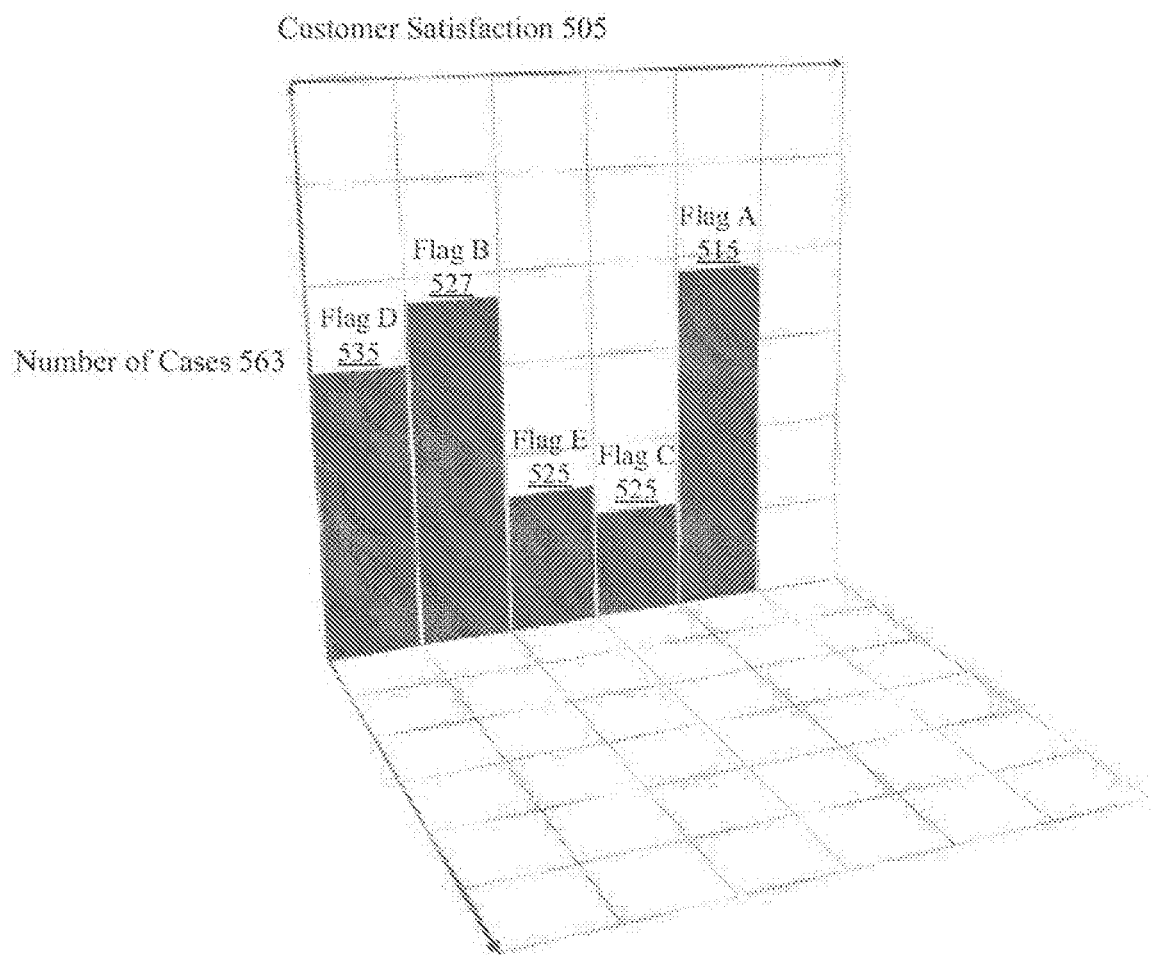
FIG. 8 – Outcome of a De-Clutter Gesture

SYSTEM AND METHOD TO NAVIGATE 3D DATA ON MOBILE AND DESKTOP

CROSS REFERENCES

The present Application for Patent is a continuation of U.S. patent application Ser. No. 15/015,010 by Kodali et al., entitled "SYSTEM AND METHOD TO NAVIGATE 3D DATA ON MOBILE AND DESKTOP" filed Feb. 3, 2016, assigned to the assignee hereof.

FIELD OF TECHNOLOGY

The technology disclosed relates generally to interaction with three-dimensional (3D) data, and in particular to providing a system and method to navigate 3D data on mobile and desktop platforms.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Multidimensional data representations can be very useful in conveying information to a data consumer. But high-dimensional data sets can be difficult to comprehend. A visualization of the data can help with communication of the embedded information, and can be realized through visual representations such as statistical graphics, plots, information graphics, tables, and charts. Data visualization can be defined as the communication of abstract data through interactive visual interfaces, which can be used to present and explore the data. Data represented in two dimensions is relatively easy to consume and explore. Data represented in three dimensions, especially as represented on a two dimensional surface such as a computer display, adds a level of complexity to consumption and exploration. Data in four or more dimensions can be vastly more difficult to understand and manipulate. The technology disclosed describes a plurality of hand gestures that facilitate how a data consumer can traverse high-dimensional data sets constructed by a data source.

BRIEF DESCRIPTION OF THE DRAWINGS

The included drawings are for illustrative purposes and serve only to provide examples of structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures.

FIG. 1A illustrates a system for capturing image data according to an implementation of the technology disclosed.

FIGS. 2A-2B illustrate a gesture to point and dive to drill into a 3 dimensional representation of data.

FIG. 5 illustrates flags representing different events of interest within a 3 dimensional representation.

FIG. 6A illustrates on example of a point and dive menu.

FIG. 6B illustrates one example of an outcome of a dive gesture by representative.

FIG. 7 illustrates one example of an outcome of a grab and pluck gesture.

FIG. 8 illustrates one example of an outcome of a de-clutter gesture.

DETAILED DESCRIPTION

Figure 1B:
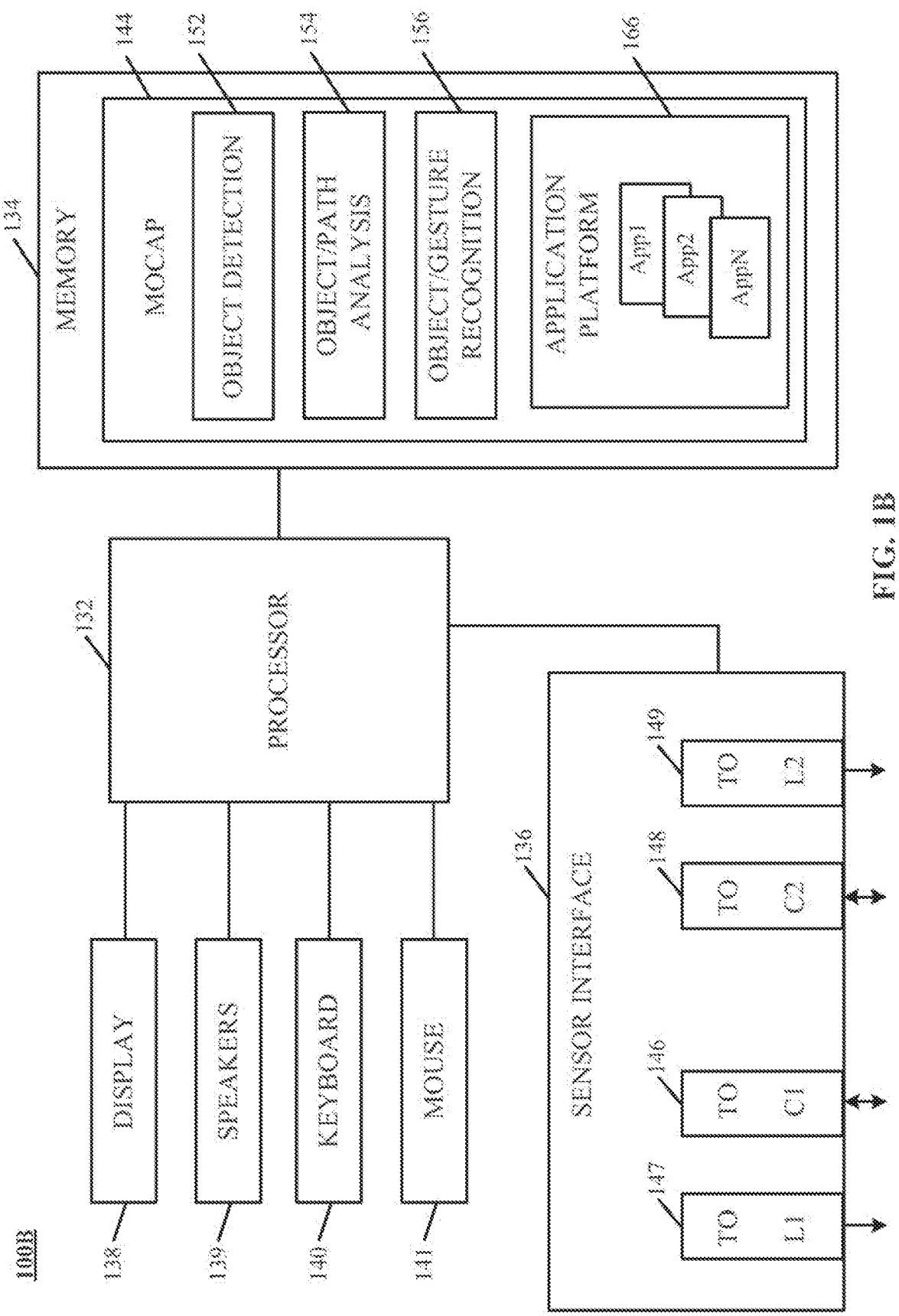
FIG. 1B is a simplified block diagram of a gesture-recognition system implementing an image analysis apparatus according to an implementation of the technology disclosed.
Figure 3A:
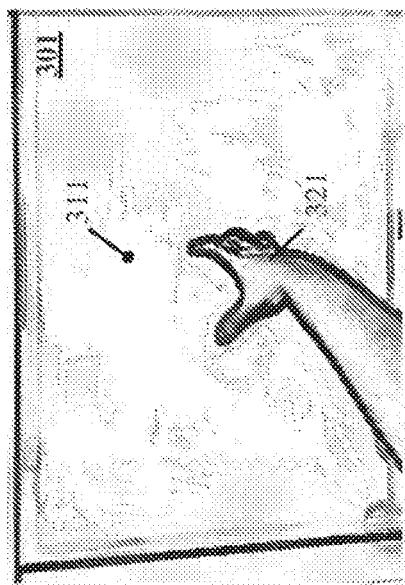
FIGS. 3A-3D illustrate a gesture to grab and pluck a flag on a 3 dimensional representation of data.
Figure 3B:
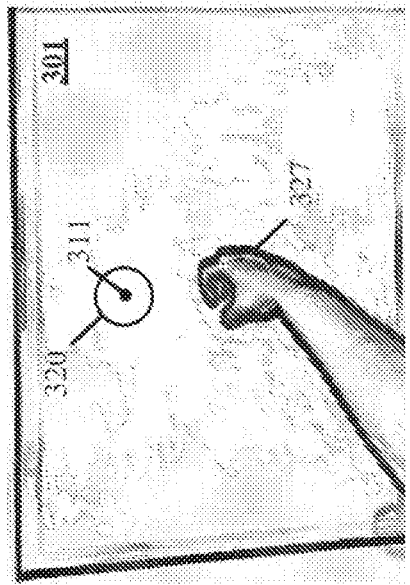
Figure 3C:
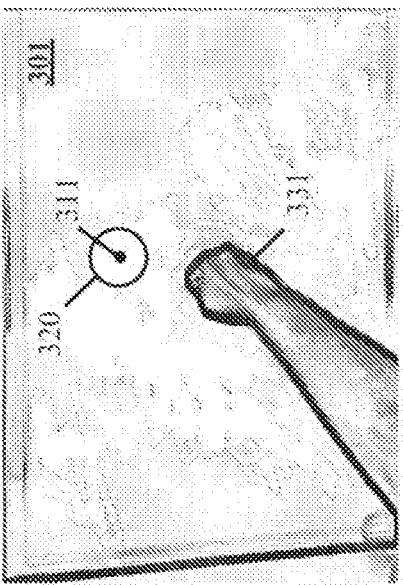
Figure 3D:
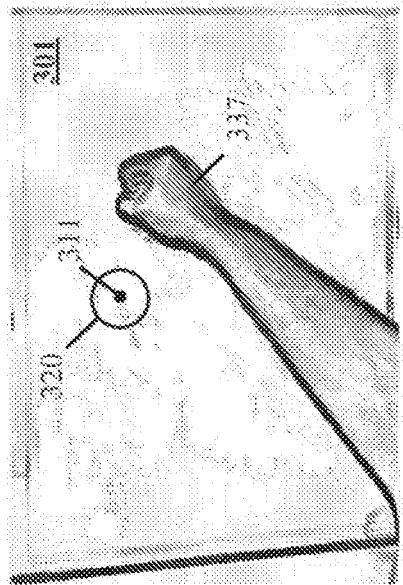

The following detailed description is made with reference to the figures. Sample implementations are described to illustrate the technology disclosed, not to limit its scope, which is defined by the claims. Those of ordinary skill in the art will recognize a variety of equivalent variations on the description that follows.

High-dimensional data sets are common in many fields such as healthcare, information technology, and ecology. For example, data on the health status of patients can include dimensions such as blood analysis over time, genetic background, surgical history, diseases, and pharmacology. The data can be linked so that a viewer can traverse the data based on interest. For example, a viewer might begin a review of a patient's information with their blood analyses, and then choose to review disease information to find an association.

With information technology, high-dimensional data can include planning for hardware and software implementations, utilization of existing systems, and operational support. Operational support can include a call center, with call tracking for hardware failures, hacking incidents, and natural disasters, where each of these categories has its own list of subsets. The technology disclosed can assist with the traversal of a high-dimensional data set such as one generated by a Salesforce Analytics Cloud using a device such as a stereoscopic 3d viewer with a smartphone, a pair of 3D glasses with a desktop, Oculus Rift, or Google Cardboard. Navigation is possible in all 3 dimensions (x,y,z) of a 3D representation of data, as well as forward and backward through a high-dimensional data set. The technology disclosed can include visual feedback as well as haptic feedback through special purpose gloves such as GloveOne.

The technology disclosed comprises three gestures: point and dive to drill into a data set, grab and pluck to initiate a 3D visualization change, and de-clutter to focus the visualization on two of three dimensions on a display. The point and dive gesture allows a viewer to choose a data point within a virtualized 3D representation, and invoke a menu identifying a plurality of options. The grab and pluck gesture allows a viewer to pick a data point from a plurality of data points, and expose details about the data point. The de-clutter gesture allows a viewer to simplify a 3D representation of data to a 2D representation.

As used herein, a given signal, event or value is "based on" a predecessor signal, event or value of the predecessor signal, event or value influenced by the given signal, event or value. If there is an intervening processing element, step or time period, the given signal, event or value can still be "based on" the predecessor signal, event or value. If the intervening processing element or step combines more than one signal, event or value, the signal output of the processing element or step is considered "based on" each of the signal, event or value inputs. If the given signal, event or value is the same as the predecessor signal, event or value, this is merely a degenerate case in which the given signal, event or value is still considered to be "based on" the predecessor signal, event or value. "Responsiveness" or "dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Referring first to FIG. 1A, which illustrates an exemplary sensory analysis system 100A including any number of cameras such as cameras 102, 104 coupled to a sensory-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side.

In some implementations, the illustrated system 100A includes one or more sources 108, 110, which can be disposed to either side of cameras 102, 104, and are controlled by sensory-analysis system 106. In one implementation, the sources 108, 110 are light sources. For example, the light sources can be infrared light sources, e.g., infrared light-emitting diodes (LEDs), and cameras 102, 104 can be sensitive to infrared light. Use of infrared light can allow the sensory analysis system 100A to operate under a broad range of lighting conditions and can avoid various inconveniences or distractions that may be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1A for clarity sake) used in conjunction with, or instead of, cameras 102, 104. The sonic sources transmit sound waves to the user; the user either blocks (or "sonic shadowing") or alters the sound waves (or "sonic deflections") that impinge upon her. Such sonic shadows and/or deflections can also be used to detect the user's gestures and/or provide presence information and/or distance information using ranging techniques known in the art. In some implementations, the sound waves are, for example, ultrasound, that is not audible to humans.

It should be stressed that the arrangement shown in FIG. 1A is representative and not limiting. For example, lasers or other light sources can be used instead of LEDs. In implementations that include laser(s), additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes a control object portion 114 that can optionally hold a tool or other object of interest and cameras 102, 104 are oriented toward the region 112 to capture video images of the hands 114. FIG. 1A depicts two hands together in one implementation, in other implementations, it can include any gesture such as a de-clutter gesture, a point gesture, a point and grab gesture, or any other gesture. In some implementations, the operation of light sources 108, 110 and cameras 102, 104 is controlled by the sensory-analysis system 106, which can be, e.g., a computer system, control logic implemented in hardware and/or software or combinations thereof. Based on the captured images, sensory-analysis system 106 determines the position and/or motion of object 114.

FIG. 1B is a simplified block diagram of a computer system 100B, implementing sensory-analysis system 106 (also referred to as an image analyzer) according to an implementation of the technology disclosed. Sensory-analysis system 106 can include or consist of any device or device component that is capable of capturing and processing image data. In some implementations, computer system 100B includes a processor 132, memory 134, a sensor interface 136, a display 138 (or other presentation mechanism(s), e.g. holographic projection systems, wearable googles or other head mounted displays (HMDs), heads up displays (HUDs), other visual presentation mechanisms or combinations thereof, speakers 139, a keyboard 140, and a mouse 141. Memory 134 can be used to store instructions to be executed by processor 132 as well as input and/or output data associated with execution of the instructions. In particular, memory 134 contains instructions, conceptually illustrated as a group of modules described in greater detail below, that control the operation of processor 132 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETW ARE operating system, the Sun Microsystems SOLARIS operating system, the OS/2 operating system, the BeOS operating system, the MAC OS operating system, the APACHE operating system, an OPEN ACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 132 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Sensor interface 136 can include hardware and/or software that enables communication between computer system 100B and cameras such as cameras 102, 104 shown in FIG. 1A, as well as associated light sources such as light sources 108, 110 of FIG. 1A. Thus, for example, sensor interface 136 can include one or more data ports 146, 148 to which cameras can be connected, as well as hardware and/or software signal processors to modify data signals received from the cameras (e.g., to reduce noise or reformat data) prior to providing the signals as inputs to a motion-capture ("mocap") program 144 executing on processor 132. In some implementations, sensor interface 136 can also transmit signals to the cameras, e.g., to activate or deactivate the cameras, to control camera settings (frame rate, image quality, sensitivity, etc.), or the like. Such signals can be transmitted, e.g., in response to control signals from processor 132, 15 which can in turn be generated in response to user input or other detected events.

Sensor interface 136 can also include controllers 147, 149, to which light sources (e.g., light sources 108, 110) can be connected. In some implementations, controllers 147, 149 provide operating current to the light sources, e.g., in response to instructions from processor 132 executing mocap program 144. In other implementations, the light sources can draw operating 20 current from an external power supply, and controllers 147, 149 can generate control signals for the light sources, e.g., instructing the light sources to be turned on or off or changing the brightness. In some implementations, a single controller can be used to control multiple light sources.

Instructions defining mocap program 144 are stored in memory 134, and these instructions, when executed, perform motion-capture analysis on images supplied from cameras connected to sensor interface 136. In one implementation, mocap program 144 includes various modules, such as an object detection module 152, an object analysis module 154, and a gesture recognition module 156. Object detection module 152 can analyze images (e.g., images captured via sensor interface 136) to detect edges of an object therein and/or other information about the object's location. Object analysis module 154 can analyze the object information provided by object detection module 152 to determine the 3D position and/or motion of the object (e.g., a user's hand). Examples of operations that can be implemented in code modules of mocap program 144 are described below. Memory 134 can also include other information and/or code modules used by mocap program 144 such as an application platform 166 that allows a user to interact with the mocap program 144 using different applications like application 1 (App1), application 2 (App2), and application N (AppN).

Display 138, speakers 139, keyboard 140, and mouse 141 can be used to facilitate user interaction with computer system 100B. In some implementations, results of gesture capture using sensor interface 136 and mocap program 144 can be interpreted as user input. For example, a user can perform hand gestures that are analyzed using mocap program 144, and the results of this analysis can be interpreted as an instruction to some other program executing on processor 132 (e.g., a web browser, word processor, or other application). Thus, by way of illustration, a user might use upward or downward swiping gestures to "scroll" a webpage currently displayed on display 138, to use rotating gestures to increase or decrease the volume of audio output from speakers 139, and so on.

It will be appreciated that computer system 100B is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 100B is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 1A and 1B, the user performs a gesture that is captured by the cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by a gesture-recognition module 156, which can be implemented as another module of the mocap 144. Gesture-recognition module 156 provides input to an electronic device, allowing a user to remotely control the electronic device and/or manipulate virtual objects, such as prototypes/models, blocks, spheres, or other shapes, buttons, levers, or other controls, in a virtual environment displayed on display 138. The user can perform the gesture using any part of her body, such as a finger, a hand, or an arm. As part of gesture recognition or independently, the sensory-analysis system 106 can determine the shapes and positions of the user's hand in 3D space and in real time. As a result, the sensory-analysis system 106 can not only recognize gestures for purposes of providing input to the electronic device, but can also capture the position and shape of the user's hand in consecutive video images in order to characterize the hand gesture in 3D space and reproduce it on the display screen 138.

In one implementation, the gesture-recognition module 156 compares the detected gesture to a library of gestures electronically stored as records in a database, which is implemented in the sensory-analysis system 106, the electronic device, or on an external storage system. (As used herein, the term "electronically stored" includes storage in volatile or nonvolatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently.

Point and Dive Gesture

The gesture recognition system 100B can be used to recognize the gestures described by the technology disclosed to navigate through, and take action on 3D data visualizations. In one implementation, FIGS. 2A and FIG. 2B, collectively referred to as FIG. 2, illustrate a gesture to point and dive into a 3 dimensional representation of data.

The so-called point and dive gesture selects a particular data point from a 3D presentation and causes display of more information about the selected data point, in a context of other data that may not have been present in the first 3D presentation, as explained below in the context of FIGS. 5-6. This accomplishes a selection and drill-down. As shown in FIG. 2B, a menu can offer multiple drill down options, if more than one is available. In the example of the gesture illustrated in FIG. 2, a stereoscopic display of 3D data 201 is rendered on a display. The 3D data can be a group of data from within a high-dimensional data set. The 3D data 201 can be an entry point into the high-dimensional data set, can be the last three dimensions of the high-dimensional dataset, or somewhere in between. The high-dimensional data set can be predefined by an operator, or can be generated by an algorithm, with the results of the gestures of the technology disclosed predefined and codified within the data set. In this example, the 3D data 201 comprises multiple data points. A data point 215 will be the target of the point and dive gesture of this example.

The point and dive gesture begins with an index finger 225 of a user pointing at a data point 215. The sensory analysis system 100A recognizes that the user is pointing an index finger at the data point 215. The gesture recognition system 100B responds by identifying the data point 215 selected. In this example, a circle 220 is rendered around the data point 215 by the gesture recognition system 100B. In other implementations, other techniques for identifying the selection can be used such as variations in color, variations in shading, or other visual cues. Once the desired data point 215 has been identified, the palms of the user's right and left hands are brought together, with fingers pointing toward the selected data point 215. In one implementation the fingers are below a horizontal plane. In another implementation, the fingers are below a plane between the hands together and the display. The system then renders a predefined menu that is rendered onto the display as an acknowledgement of the gesture, the menu being a list of views or actions to be taken on the underlying data within the high-dimensional data structure. If there is one item in the menu, the system can automatically chose that item. If there are two or more menu options that can be chosen by the user, the user can point to her selection on the menu with an index finger.

Grab and Pluck to Select a Flagged Point Gesture

The grab and pluck gesture is directed to a selectable feature, such as a flag, in the 3D data display. FIGS. 3A-3D, collectively referred to as FIG. 3, illustrate a gesture to grab and pluck a flag displayed on a 3 dimensional representation of data. In this example, a stereoscopic display of 3D data 301 is rendered on a display. The 3D data can be a group of data from within a high-dimensional data set. The 3D data 301 can be an entry point into the high-dimensional data set, can be the last three dimensions of the high-dimensional dataset, or somewhere in between. The high-dimensional data set can be predefined by an operator, or can be generated by an algorithm, with the results of the gestures of the technology disclosed predefined and codified within the data set. In this example, the 3D data 301 comprises multiple data points. A data point 311 is the target of the grab and pluck gesture of this example. In some implementations, a data point can be a virtual object generated via computer graphics. Such a virtual object can take any shape or form and mimic real-world objects like a flag, a scissor, a pin, a ball, a notebook, a sticky slip. etc.

In one implementation, the grab and pluck gesture begins with an open hand 321 of a user reaching toward a data point 311. The sensory analysis system 100A recognizes that the user is reaching toward the data point 311. The gesture recognition system 100B responds by identifying the data point 311 selected. In this example, a circle 320 is rendered around the data point 311 by the gesture recognition system 100B. In other implementations, other techniques for identifying the selection can be used such as variations in color, variations in shading, or other visual cues. In another implementation, the grab and pluck gesture begins with a pointing gesture that causes selection of a particular data point (like data point 311).

Once the data point of interest has been selected, the user begins to close the fingers 327 of the open hand in on each other. In one implementation, a visual cue is rendered on the display indicating the step of the gesture, whereas in another implementation, no visual cue is rendered. The sensory analysis system 100A recognizes the grab gesture when a thumb and one or more fingers of the reaching hand touch, or when the hand is closed into a fist 331. To complete the grab and pluck gesture, the user can begin moving the closed hand away from the selected object 337. This initiates a visualization change, the change being dependent on the flag that was grabbed. An example of a result of the grab and pluck gesture is illustrated in FIG. 7 described below.

De-Clutter Gesture

Figure 4A:
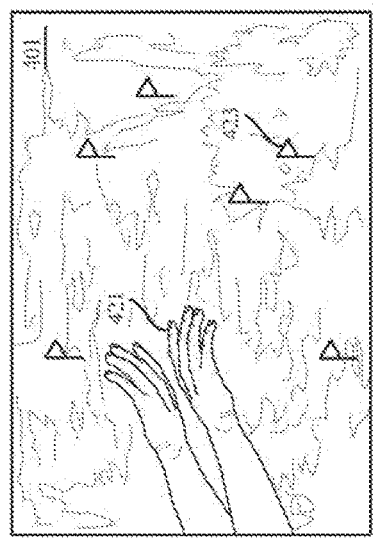
FIGS. 4A-4C illustrate a gesture to de-clutter a display of a 3 dimensional representation of data.
Figure 4B:
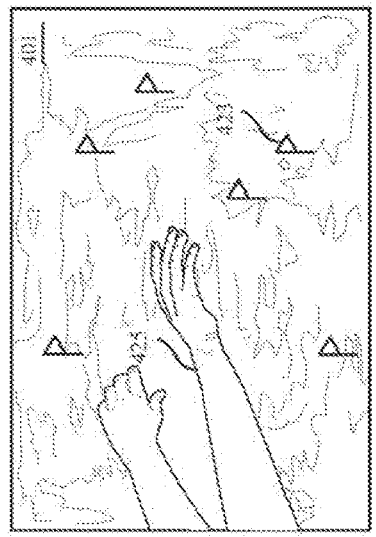
Figure 4C:
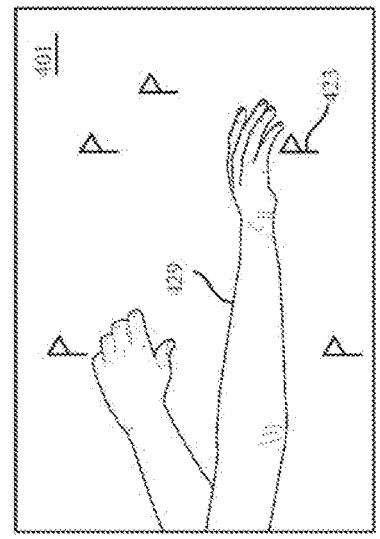

The de-clutter gesture applies to a 3D display with labeled and unlabeled data points, and allow the user to remove the non-labelled points from the 3D display, leaving a simpler display of the labelled points. In one implementation, FIGS. 4A-4C, collectively referred to as FIG. 4, illustrate a gesture to de-clutter a 3 dimensional representation of data. In this example, a stereoscopic display of 3D data 401 is rendered on a display. The de-clutter gesture, also referred to as a part, uses two hands. A user first places the backs of her left and right hands together while facing the 3D display. FIG. 4A illustrates a user placing the backs of her left and right hands together 421, with fingers toward the 3D data display 401. The sensory analysis system 100A recognizes that the user is holding the backs of her hands together 421. The user then begins moving her hands away from each other 425 as illustrated in FIG. 4B. Once the hands have reached a configurable distance from each other 429, as illustrated in FIG. 4C, the sensory analysis system 100A recognizes the completion of the de-clutter gesture, and the action declutters the screen to focus on the labelled data points of interest, which in this example are flags 423. The 3D data can be a group of data from within a high-dimensional data set. The 3D data 401 can be an entry point into the high-dimensional data set, can be the last three dimensions of the high-dimensional dataset, or somewhere in between. The high-dimensional data set can be predefined by an operator, or can be generated by an algorithm, with the results of the gestures of the technology disclosed predefined and codified within the data set. In this example, the 3D data 401 comprises multiple data points, such as data point 423. An example of a result of a de-clutter gesture is illustrated in FIG. 8 described below.

Example 3D Display of Higher Dimensionality Data

In one implementation of a high-dimensional data set that can be used to illustrate the three gestures disclosed, a high-dimensional data set is created that summarizes operational support statistic. Operation support can include a call center, with call tracking for hardware failures, hacking incidents, and natural disasters, where each of these categories has its own list of subsets. These subsets can include the following:
Hardware failures
Router
Switch
Power source
Server
Cabling
Hacking incidents
Distributed Denial of Service (DDOS)
Social Engineering
Phishing
Man in the middle
Natural disasters
Lightning
Earthquake
Tsunami
Hurricane These operational support issues are illustrated in FIG. 5. In this example, Flag A 515 could be a hardware failure such as a bad switch, where the problem had a low number of cases 563, and a low resolution time 567 so that the network availability was not seriously impacted, which results in a high customer satisfaction 505 score.

Flag B 527 could be a natural disaster such as a tsunami warning that caused support staff to leave the facility, with a low number of cases 563, a high resolution time 567, but a high customer satisfaction score 505 due to a perceived execution of a good process during a natural disaster.

Flag C 525 could be a phishing scam (hack), where there are a medium number of cases 563, a medium resolution time 567, but a low customer satisfaction score 505, as it could be assumed by the customers that phishing scams are annoying at any level.

Flag D 535 could be lighting struck data center 4 times. This example would show a large number of cases 563, with high resolution times 567 due to multiple effects on power. This example still shows high customer satisfaction 505 due to an understanding that there's a serious natural disaster.

Flag E 523 could be a low impact social engineering hack such as a virus hoax that results in a large number of cases 563 that are quickly resolved, but that aggravate customers so that they leave relatively low customer satisfaction scores.

FIG. 6A illustrates a menu 611 which is the result of the point and dive gesture. In this example, a user selects to dive into a deeper layer within the high dimensional data that is 30 organized by representative.

Point and Dive Example

As illustrated in FIG. 2, a point and dive gesture is carried out with Flag D 535 of FIG. 5 as a target. In this example, a circle 625 is drawn around the selected flag 535. In another example, some other indication of selection can occur, such as the color of the flag can change. Also in this example, a menu 611 pops up showing a list of options, which include showing associated data by representative, by data center, or over time. FIG. 6B illustrates the effect of the viewer choosing "By Representative" from the menu 611, which drills down into a 3D representation of resolution times 645 and satisfaction ratings 681 by representative 699. In this example, the 3D representation illustrates that representative A 655 has the highest resolution times 645 for his cases, and the lowest overall satisfaction ratings 681. In one example, the volume identified as A 655 can be a volume of calls, included as a 4th dimension in the figure. In this example, representative B 665 has a lower volume of calls, which allows him a lower overall resolution time 645, and a higher overall satisfaction rating 681. Representative C has a very low volume of calls, with a consistently low resolution time, and a wide range of satisfaction scores. This could indicate that representative C 675 is new.

Grab and Pluck Example

FIG. 7 illustrates a result of a grab and pluck gesture. In this example, a viewer reaches toward flag D 535 on FIG. 5 as illustrated by FIG. 3. In this example, The lightning severity of the 4 lightning strikes 715 show a reduced severity and a fewer number of cases 721 over historical time 729.

De-Clutter

FIG. 8 illustrates one example of an outcome of a de-clutter gesture. In this example, performing a de-clutter gesture on FIG. 5, as illustrated in FIG. 4, reduces the representation from three dimensions (customer satisfaction 505, number of cases 563, and resolution time 567) to two dimensions (customer satisfaction 505 and number of cases 563). In another example, the two remaining dimensions can be customer satisfaction 505 and resolution time 567.

3D Data Display Generation

The 3D data display can be generated using a variety of techniques, e.g. holographic projection systems, wearable goggles or other head mounted displays (HMDs), heads up displays (HUDs). In one implementation, the 3D data is projected onto a conference room table for a meeting so it can be explored like an architect's building model. In such an implementation, attendees can view the 3D data using a head mounted display like Oculus Rift™ or wearable goggles like Google Glass™.

Voice Commands

In other implementations, voice commands can be used in conjunction with the gestures discussed above to manipulate the 3D data display. In one implementation, a voice command can precede or follow a hand gesture like a point gesture, or a point and dive gesture or a grab and pluck gesture or a de-clutter gesture. In some implementations, a voice command issued to change an existing mode and share content. For instance, if there multiple modes to a 3D data display, such as an explore mode, a filter mode, an exit mode or an annotate mode, a voice command can cause transition from one mode to another or from a mode generated by a gesture to a new mode generated by the voice command. In other implementations, a voice command can perform data manipulations such a grouping or sorting data based on one or more parameters or criteria. In a further implementation, a voice command can be used to share content across an online social network or between users in an intra-organization network. Examples of such networks include Facebook™, Twitter™, YouTube™, Chatter™, and the likes.

In yet another implementation, voice commands can be used to verbally issue natural language processing (NLP) queries such as "who are my top 10 sales representative who sold the most last quarter in the North America region?" Such a verbal NLP query is responded by generating resulting visualizations, without requiring a user to employ one or more touch commands that usually require issuing multiple sub-commands such as grouping, sorting, listing, etc.

Haptic Commands

In one implementation, the technology disclosed utilizes haptic feedback to allow interaction with the 3D data display. In such an implementation, a haptic projector is used that is receptive of different haptic properties of the virtual 3D objects (e.g. flag, pin, or any other data point), including surface texture and relative elevation. The haptic projector communicates different haptic properties of the 3D objects through vibration frequencies of varying magnitudes that apply pressure on a specialized device worn by a user, e.g. a haptic-enabled glove or feeler. Such a specialized device simulates tactile sensations with application of mechanical force on the user's hand. Thus, in one anomaly detection implementation, the haptic-enabled glove detects a data point on the 3D data display that is a certain standard deviation away from a moving average. The haptic-enabled glove translates the peak of the anomalous data point into corresponding pressure applied on a user's hand. In some implementations, such sensory information like pressure or vibrations are communicated to the user when the user's hand traverses the anomalous data point on the 3D data display.

In yet other implementations, a degree of pressure applied on the user's hand via the haptic-enabled glove is responsive to the degree of deviation of the anomalous data point such that greater the peak of the anomalous data point, higher the applied pressure. In other implementations, the degree of pressure applied on the user's hand via the haptic-enabled glove is responsive to the magnitude of a value of data point.

In a further implementation, detection of different data points is distinguished by applying pressure or other sensory information on different portions of a user's hand. For instance, a first type of flag causes vibration being applied on an index finger of a user's hand, and a second type of flag causes vibration being applied on a thumb of the user's hand.

Some Particular Implementations

In one implementation, described is a method of supporting navigation through three-dimensional (3D) data presented stereoscopically to a viewer. The method includes causing stereoscopic display of three-dimensional (3D) data to a viewer and receiving gesture data from a 3D sensor that is monitoring a 3D sensory space, the gesture data indicating a user performing a point and dive gesture sequence. The gesture sequence observed in the 3D sensory space includes an index finger pointing to a point on a surface of the 3D data display, followed by convergence of right and left hand palms. The method further causes updating of the 3D data display, based on recognition of the pointing to the surface, to graphically depict selection of data responsive to the pointing, updating of the 3D data display, based on recognition of the convergence of right and left hand palms, to include a menu and updating of the 3D data display, based on recognition of a pointing to an item on the menu, to graphically depict a selection among the menu choices.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in previous sections of the application.

In one implementation, the convergence of right and left hand palms further includes fingers pointing towards the 3D data display below a horizon. In another implementation, the pointing to the item on the menu includes using an index finger.

The method further includes receiving gesture data from the 3D sensor specifying detection of a dive gesture, wherein the received gesture data includes a signal to drill down into data selected by the pointing and causing updating of the 3D data display to graphically depict drilling down into the selected data.

The method also includes causing updating of the 3D data display to graphically depict a menu in response to the drilling down and causing updating of the 3D data display to graphically select a menu item from the menu in response to a pointing gesture performed after the drilling down.

Other implementations may include a computer implemented system to perform any of the methods described above, the system including a processor, memory coupled to the processor, and computer instructions loaded into the memory. Yet another implementation may include a tangible non-transitory computer readable storage medium impressed with computer program instructions that cause a computer to implement any of the methods described above. The tangible computer readable storage medium does not include transitory signals.

In another implementation, described is a method of supporting navigation through three-dimensional (3D) data presented stereoscopically to a viewer. The method includes causing stereoscopic display of three-dimensional (3D) data that includes selectable flags and receiving gesture data from a 3D sensor that is monitoring a 3D sensory space, the gesture data indicating a gesture sequence of a user plucking one of the selectable flags. The gesture sequence includes one or more fingers pointing at one of the selectable flags to select at least one flag, followed by one or more fingertips of a hand directed to plucking the selected flag, which is in turn followed by a hand or two or more fingers of the hand closing on and plucking the selected flag. The method further includes updating of the 3D data display, based on recognition of the finger pointing, to graphically depict selectable flags responsive to the finger pointing, updating of the 3D data display, based on recognition of the fingertips of the hand directed to plucking, to graphically identify the selected flag and updating of the 3D data display, based on recognition of the hand or two or more fingers of the hand closing on and plucking the selected flag, to graphically depict plucking of the selected flag.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in previous sections of the application.

The method also includes causing updating of the 3D data display with a change in visualization, the change dependent on the flag plucked.

Other implementations may include a computer implemented system to perform any of the methods described above, the system including a processor, memory coupled to the processor, and computer instructions loaded into the memory. Yet another implementation may include a tangible non-transitory computer readable storage medium impressed with computer program instructions that cause a computer to implement any of the methods described above. The tangible computer readable storage medium does not include transitory signals.

In a further implementation, described is a method of supporting navigation through three-dimensional (3D) data presented stereoscopically to a viewer. The method includes causing stereoscopic display of three-dimensional (3D) data that includes a plurality of data points graphically arranged along three axes of the 3D data display and receiving gesture data from a 3D sensor that is monitoring a 3D sensory space, the gesture data indicating a de-clutter gesture sequence performed by a user. The de-clutter gesture sequence includes backs of right and left hands of the user initially together and followed by, backs of the hands moving apart. The method further includes updating of the 3D data display, based on recognition of the de-clutter gesture, to graphically transition, from the plurality of data points along the three axes, to a set of points selected from the plurality and arranged along two axes of the 3D data display. The graphical transition causes updating of the 3D data display to rearrange the set of points from respective initial positions along the three axes to respective final positions along the two axes.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in previous sections of the application.

Other implementations may include a computer implemented system to perform any of the methods described above, the system including a processor, memory coupled to the processor, and computer instructions loaded into the memory. Yet another implementation may include a tangible non-transitory computer readable storage medium impressed with computer program instructions that cause a computer to implement any of the methods described above. The tangible computer readable storage medium does not include transitory signals.

What is claimed is:

1. A method of supporting navigation through three-dimensional (3D) data presented stereoscopically to a viewer, the method including:
   causing stereoscopic display of 3D data;
   receiving gesture data from a 3D sensor that is monitoring a 3D sensory space, the gesture data indicating a gesture sequence of a user plucking a selected flag from a plurality of selectable flags;
   wherein the gesture sequence includes:
      one or more fingers of a hand pointing toward the 3D data display;
      followed by, two or more fingers of the hand directed towards the selected flag, wherein the two or more fingers have not yet closed on the selected flag; and
      followed by, the two or more fingers of the hand closing on and plucking the selected flag;
   based at least in part on recognition of the one or more fingers pointing toward the 3D data display, causing updating of the 3D data display to graphically depict the plurality of selectable flags;
   based at least in part on recognition of the two or more fingers directed to plucking towards the selected flag, causing updating of the 3D data display to graphically identify the selected flag located at a first resolution level of the 3D data display; and
   based at least in part on recognition of the two or more fingers closing on and plucking the selected flag, causing a pop-up drill down menu with selectable options to overlay the 3D data display and updating of the 3D data display to graphically depict plucking of the selected flag, wherein the selection of drill down menu option with plucking of the selected flag causes updating the 3D data display with additional information associated with the selected flag and rendering the selected flag onto a second resolution level of the 3D data display.

2. The method of claim 1, further comprising:
receiving the gesture data from the 3D sensor that is monitoring the 3D sensory space, the gesture data indicating that the two or more fingers of the hand moving away from the 3D data display; and
based at least in part on recognition of the two or more fingers of the hand moving away from the 3D data display, causing updating of the 3D data display with a change in visualization, wherein the change in visualization is based at least in part on the selected flag.

3. The method of claim 1, further comprising:
determining that all fingers of the hand have closed into a fist, wherein causing updating of the 3D data display to graphically depict plucking of the selected flag is based at least in part on all fingers of the hand closing into the fist.

4. The method of claim 1, further comprising:
determining that a first finger of the hand has closed on a second finger of the hand, wherein causing updating of the 3D data display to graphically depict plucking of the selected flag is based at least in part on the first finger of the hand closing on the second finger of the hand.

5. The method of claim 1, wherein causing updating of the 3D data display to graphically identify the selected flag further comprises:
causing updating of the 3D data display to modify one or more visual properties associated with the selected flag.

6. The method of claim 5, wherein the one or more visual properties comprise at least one of a shape rendered around the selected flag, a shading associated with the selected flag, a color associated with the selected flag, or a combination thereof.

7. The method of claim 1, further comprising:
receiving a haptic command from the 3D sensor that is monitoring the 3D sensory space;
determining, based at least in part on receiving the haptic command, sensory information applied on the two or more fingers of the hand; and
based at least in part on determination of the sensory information applied on the two or more fingers of the hand, causing updating of the 3D data display to graphically identify the selected flag.

8. The method of claim 1, further comprising:
receiving a voice command from the 3D sensor that is monitoring the 3D sensory space; and
based at least in part on receiving the voice command, transitioning from a first mode associated with the 3D data display to a second mode associated with the 3D data display.

9. The method of claim 8, wherein the first mode and the second mode comprise one or more of an explore mode, a filter mode, an exit mode, an annotate mode, or a combination thereof.

10. The method of claim 8, wherein the voice command is received after receiving the gesture sequence of the user plucking the selected flag from the plurality of selectable flags.

11. The method of claim 8, wherein the first mode is generated by at least one gesture from the gesture sequence and the second mode is generated by the voice command.

12. The method of claim 8, wherein the first mode is different from the second mode.

13. An apparatus for supporting navigation through three-dimensional (3D) data presented stereoscopically to a viewer, comprising:
a processor;
memory coupled with the processor; and
instructions stored in the memory and executable by the processor to cause the apparatus to:
cause stereoscopic display of 3D data;
receive gesture data from a 3D sensor that is monitoring a 3D sensory space, the gesture data indicating a gesture sequence of a user plucking a selected flag from a plurality of selectable flags;
wherein the gesture sequence includes:
one or more fingers of a hand pointing toward the 3D data display;
followed by, two or more fingers of the hand directed towards the selected flag, wherein the two or more fingers have not yet closed on the selected flag; and
followed by, the two or more fingers of the hand closing on and plucking the selected flag;
based at least in part on recognition of the one or more fingers pointing toward the 3D data display, update of the 3D data display to graphically depict the plurality of selectable flags;
based at least in part on recognition of the two or more fingers directed to plucking towards the selected flag, update of the 3D data display to graphically identify the selected flag located at a first resolution level of the 3D data display; and
based at least in part on recognition of the two or more fingers closing on and plucking the selected flag, cause a pop-up drill down menu with selectable options to overlay the 3D data display and update of the 3D data display to graphically depict plucking of the selected flag, wherein the selection of drill down menu option with plucking of the selected flag causes updating the 3D data display with additional information associated with the selected flag and rendering the selected flag onto a second resolution level of the 3D data display.

14. The apparatus of claim 13, wherein the instructions are further executable by the processor to cause the apparatus to:
receive the gesture data from the 3D sensor that is monitoring the 3D sensory space, the gesture data indicating that the two or more fingers of the hand moving away from the 3D data display; and
based at least in part on recognition of the two or more fingers of the hand moving away from the 3D data display, update of the 3D data display with a change in visualization, wherein the change in visualization is based at least in part on the selected flag.

15. The apparatus of claim 13, wherein the instructions are further executable by the processor to cause the apparatus to:
determine that all fingers of the hand have closed into a fist, wherein updating of the 3D data display to graphically depict plucking of the selected flag is based at least in part on all fingers of the hand closing into the fist.

16. The apparatus of claim 13, wherein the instructions are further executable by the processor to cause the apparatus to:
determine that a first finger of the hand has closed on a second finger of the hand, wherein updating of the 3D data display to graphically depict plucking of the selected flag is based at least in part on the first finger of the hand closing on the second finger of the hand.

17. The apparatus of claim 13, wherein the instructions are further executable by the processor to cause the apparatus to:

update of the 3D data display to modify one or more visual properties associated with the selected flag.

18. The apparatus of claim 17, wherein the one or more visual properties comprise at least one of a shape rendered around the selected flag, a shading associated with the selected flag, a color associated with the selected flag, or a combination thereof.

19. The apparatus of claim 13, wherein the instructions are further executable by the processor to cause the apparatus to:
receive a haptic command from the 3D sensor that is monitoring the 3D sensory space;
determine, based at least in part on receiving the haptic command, sensory information applied on the two or more fingers of the hand; and
based at least in part on determination of the sensory information applied on the two or more fingers of the hand, update of the 3D data display to graphically identify the selected flag.

20. A non-transitory computer-readable medium storing code for supporting navigation through three-dimensional (3D) data presented stereoscopically to a viewer, the code comprising instructions executable by a processor to:
a processor;
memory coupled with the processor; and
instructions stored in the memory and executable by the processor to cause the apparatus to:
cause stereoscopic display of 3D data;
receive gesture data from a 3D sensor that is monitoring a 3D sensory space, the gesture data indicating a gesture sequence of a user plucking a selected flag from a plurality of selectable flags;
wherein the gesture sequence includes:
one or more fingers of a hand pointing toward the 3D data display;
followed by, two or more fingers of the hand directed towards the selected flag, wherein the two or more fingers have not yet closed on the selected flag; and
followed by, the two or more fingers of the hand closing on and plucking the selected flag;
based at least in part on recognition of the one or more fingers pointing toward the 3D data display, update of the 3D data display to graphically depict the plurality of selectable flags;
based at least in part on recognition of the two or more fingers directed to plucking towards the selected flag, update of the 3D data display to graphically identify the selected flag located at a first resolution level of the 3D data display; and
based at least in part on recognition of the two or more fingers closing on and plucking the selected flag, cause a pop-up drill down menu with selectable options to overlay the 3D data display and update of the 3D data display to graphically depict plucking of the selected flag, wherein the selection of drill down menu option with plucking of the selected flag causes updating the 3D data display with additional information associated with the selected flag and rendering the selected flag onto a second resolution level of the 3D data display.

* * * * *